UNITED STATES PATENT OFFICE 2,586,305

SYNTHESIS OF VITAMIN A AND INTERMEDIATES THEREFOR

John William Copenhaver, Short Hills, N. J., assignor to General Aniline & Film Corporation, New York, N. Y., a corporation of Delaware No Drawing. Application October 26, 1949, Serial No. 123,787

15 Claims. (Cl. 260—611)

This invention relates to a process for the synthesis of vitamin A.

Previously proposed methods for synthesizing vitamin A involved the preparation of highly unsaturated intermediate compounds containing a plurality of olefinic linkages, and in some cases, an acetylenic linkage, which are subjected to a series of processing steps and/or condensations, wherein the tendency of the highly unsaturated compounds to undergo side reactions impairs the yield, renders purification of the product relatively difficult and expensive, and requires special precautions in carrying out the process.

It is an object of this invention to provide a process for the synthesis of vitamin A, starting from beta-ionone, wherein no increase in unsaturation occurs until an intermediate having the carbon skeleton of vitamin A is formed, the additional double bonds of the final product being introduced only after the carbon skeleton of the final product is complete.

It is also an object of this invention to provide a series of novel intermediate compounds, formed in the synthesis of vitamin A in accordance with the invention, and to provide processes for preparing these compounds one from the other.

By reason of the fact that no increase occurs in unsaturation during the synthesis of the vitamin A skeleton in accordance with my invention, the tendency to undergo side reactions, polymerization or oxidation, and the attendant losses and difficulties encountered in previously known processes are substantially reduced, and a more economical and convenient procedure is made available.

As was known heretofore, vitamin A is a pentaolefinic alcohol having the following formula:

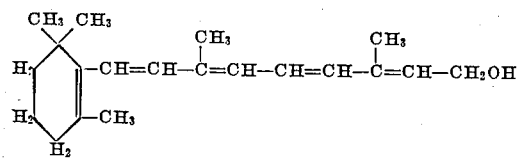

The starting material employed in accordance with my invention is beta-ionone having the following formula:

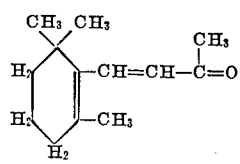

Briefly, the steps involved in my new process are the following:

1. Conversion of beta-ionone to a ketal thereof by reaction with an ortho-carboxylic acid ester, as indicated by the following equation:

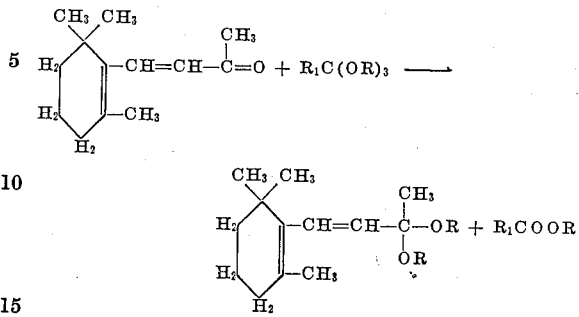

($R_1$ being hydrogen or a hydrocarbon radical, and R representing the residue of an alcohol.)

2. Condensation of the resulting beta-ionone ketal, successively, with 1 mol of an alkyl vinyl ether, 1 mol of an alkyl isopropenyl ether, and 1 mol of an alkyl vinyl ether, forming a series of ether acetals in accordance with the following equations:

(a)

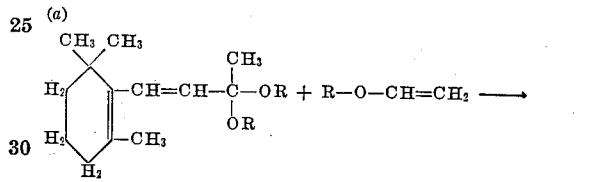

(b)

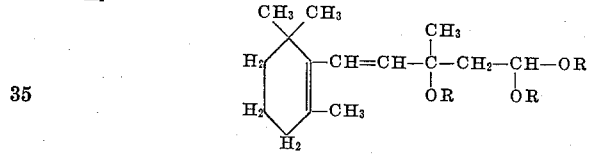

(c)

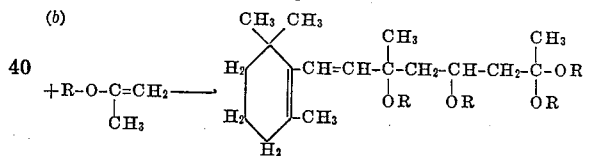

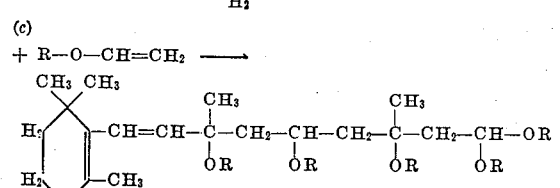

(R representing the hydrocarbon radicals of the ketals and of the vinyl or isopropenyl ethers.)

3. The polyether acetal resulting from step 2(c) above, which possesses the skeleton of vitamin A is subjected to dealcoholation and hydrolysis of the acetal radical, to form the corresponding pentaolefinic aldehyde corresponding to vitamin A as follows:

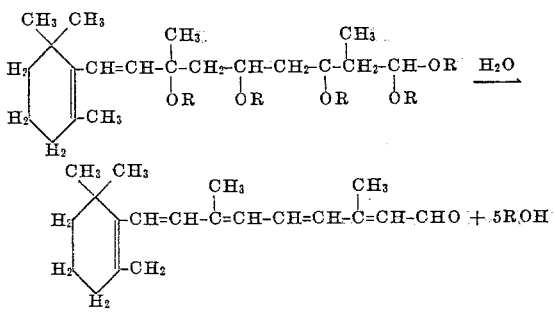

4. The aldehyde radical of the compound obtained as indicated in step 3 above, is reduced to an alcohol radical, forming vitamin A.

The following series of examples illustrates preferred methods which may be employed for carrying out the processes of my invention, wherein parts are by weight unless otherwise indicated. The numbers of the examples correspond to the steps formulated above.

Example 1

19.2 parts (0.1 mol) of beta-ionone is added to 21.2 parts (0.2 mol) of methyl ortho-formate containing 0.05 part of the diethyl ether complex of boron trifluoride ($BF_3$ etherate) at a temperature of 25–45° C. The reaction mixture is allowed to stand for 2–3 hours while maintaining the temperature within the aforesaid range. The reaction mixture is dissolved in ether, and the $BF_3$ catalyst neutralized with a small amount of sodium ethylate or ethanolamine. The ether solution is washed with water, separated from the aqueous layer and dried over anhydrous sodium sulfate. The ether is evaporated and beta-ionone dimethyl ketal is recovered by distillation under reduced pressure from the residual oil.

Example 2(a)

23.8 parts (0.1 mol) of beta-ionone dimethyl ketal are mixed with 0.075 part (0.0005 mol) of $BF_3$ etherate. The mixture is heated to 450 C., and 2 parts (0.035 mol) of methyl vinyl ether are gradually introduced over a period of 15 minutes. The reaction mixture is then stirred at 45–50° C. for 2 hours, cooled and the catalyst neutralized by addition of a small amount of sodium methylate. The neutralized mixture is distilled under reduced pressure to remove excess beta-ionone dimethyl ketal, and the condensation product having the following formula:

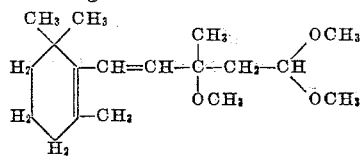

is distilled at highly reduced pressure, particularly by so-called "molecular" distillation.

Example 2(b)

29.6 parts (0.1 mol) of the reaction product of Example 2(a) are mixed with 0.075 part (0.0005 mol) of $BF_3$ etherate, and 2.4 parts (0.33 mol) of methyl isopropenyl ether are gradually added to the mixture over a period of 15 minutes. The reaction mixture is stirred at 45–50° C. for 2 hours, cooled and the catalyst neutralized as in Example 2(a).

The reaction mixture is worked up in the same manner as in Example 2(a), whereby a condensation product is recovered having the following formula:

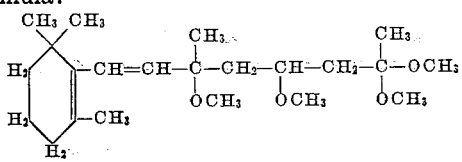

Example 2(c)

36.8 parts (0.1 mol) of the reaction product of Example 2(b) are treated with 2 parts (0.035 mol) of methyl vinyl ether in the presence of 0.075 part (0.0005 mol) of $BF_3$ etherate, and the resulting condensation product is recovered in the same manner as in Examples 2(a) and 2(b). The condensation product thus obtained has the following formula:

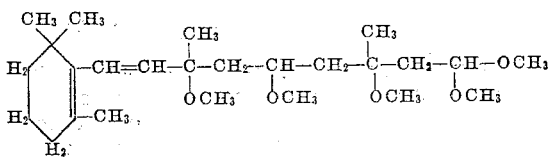

Example 3

42.6 parts (0.1 mol) of the condensation product of Example 2(c) are mixed with 3.6 parts (0.2 mol) of water containing 0.05 part of p-toluene sulfonic acid. The mixture is heated in a distillation apparatus provided with fractionating column, in an inert atmosphere such as nitrogen, to 50° C., and vigorously agitated at this temperature for ½ hour. The temperature is then gradually raised to 65° C., until distillation of methanol virtually ceases. The residue is then taken up in ether, the ethereal solution washed with dilute aqueous sodium carbonate, then with water, and then dried over anhydrous sodium sulfate. These operations are preferably carried out in an atmosphere of nitrogen or other inert gas. The ether is then evaporated from the solution in a nitrogen atmosphere, leaving as a residue a penta-unsaturated aldehyde having the following formula:

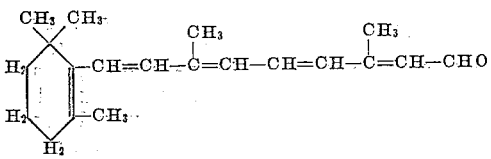

Example 4

The aldehyde obtained according to Example 3 (about 30 parts) is dissolved in 300 parts of absolute isoprophyl alcohol, and heated to boiling in an atmosphere of nitrogen in a reflux apparatus. 15 parts of aluminum isopropylate are added and isopropyl alcohol is gradually distilled from the mixture while replacing it with fresh isopropyl alcohol in the course of the distillation. The distillation is continued until the isopropyl alcohol distillate fails to yield a positive test for acetone by formation of the crystalline phenyl hydrazone upon treatment with p-nitrophenyl hydrazine in glacial acetic acid. The reaction mixture is then diluted with petroleum ether (B. P. 30-40° C.) and extracted with 5% aqueous phosphorous acid. The aqueous extract is extracted with additional petroleum ether and the combined petroleum ether extracts are dried over anhydrous sodium sulfate, yielding a solution of vitamin A. The product can be recovered from the solution by chromatographic adsorption on aluminum oxide from the petroleum ether solution, and elutriated from the adsorbent with a mixture of benzene and petroleum ether. A pure product can be obtained in this manner, having properties similar to vitamin A obtained from natural substances.

In carrying out the successive steps of the process illustrated in the foregoing examples, numerous variations and modifications can be made, if desired.

Thus, in the procedure of Example 1, the orthoester employed for conversion of beta-ionone to the corresponding ketal, can be an ortho-ester of lower fatty carboxylic acids other than formic acid, e. g. it can be an ortho-acetate, ortho-propionate, or ortho-butyrate.

Similarly, the ortho-ester may include the radicals of other lower monohydric alcohols instead of methyl alcohol, e. g. ethyl, propyl, butyl or benzyl alcohol. Ortho-esters of lower aliphatic carboxy acids can also be used in which the esterifying alcohols include dihydric alcohols such as 1,3-propanediol, together with a monohydric alcohol, as found, for example, in 2-ethoxy-1,3-dioxolane, which is an ortho-ester of formic acid with ethyl alcohol and 1,3-propanediol.

The proportions of the ortho-ester and beta-ionone can be varied, but it is convenient to employ a molecular excess of ortho-ester with respect to the ionone, a mol ratio of about 2:1 being particularly suitable as illustrated in Example 1.

An acid condensation catalyst is employed to promote ketal formation, such catalysts including $BF_3$, $BF_3$ etherate, $BCl_3$, $SnCl_4$, $TiCl_4$, or $H_2SO_4$, or acid salts such as ammonium chloride or ammonium nitrate, a suitable proportion of catalyst being from 0.0001 to 0.01 mol per mol of ortho-ester. The temperature employed in the reaction can be from 0 to 50° C. Higher temperatures within this range accelerate the reaction and in general, provide more satisfactory operating conditions.

The methyl ethers of vinyl and isopropenyl alcohols employed in Examples 2(a), 2(b) and 2(c) can be replaced by other alkyl ethers, such as the corresponding ethyl, propyl, isopropyl, butyl and benzyl ethers of vinyl and isopropenyl alcohol. The condensation reactions of these examples are carried out under anhydrous conditions. While an inert solvent or diluent can be used, it is generally more advantageous to bring the reagents together in the absence of a diluent so as to afford maximum opportunity for rapid combination of the vinyl or isopropenyl ether with the ketal or acetal. To limit undesirable side reactions, especially polymerization of the vinyl or isopropenyl ethers, a substantial excess of the ketal or acetal is preferably maintained in the reaction mixture throughout the condensation. Thus, in general, it is preferred to employ at least 2 and preferably about 3 mols of the acetal or ketal for each mol of vinyl or isopropenyl ether introduced. By reason of the resulting inhibition of polymerization of the vinyl or isopropenyl ethers, a higher ultimate yield can be obtained when the unreacted acetal or ketal, recovered in each case, is recycled to a subsequent condensation.

The condensation reactions of Examples 2(a), 2(b) and 2(c) are promoted by inclusion of acid reacting anhydrous condensing agents as catalysts in the mixture, as, for example, those used in Example 1. The proportion of catalyst employed can be from 0.0001 to 0.1 mol per mol of the acetal or ketal, and is preferably between 0.0025 and 0.01 mol. The temperature of the condensation can vary between 0 and 100° C., but is preferably not higher than 50° C. Vinyl methyl ether (B. P. 12–14° C.) is a gas at room temperature, while the higher molecular weight ethers as well as the isopropenyl ethers are liquid. When the temperature employed is such that the ether is relatively volatile, superatmospheric pressures can be used to avoid excessive volatilization of the ether from the reaction mixture.

In carrying out the dealcoholation and hydrolysis of Example 3, water is added to the polyether acetal in at least an equimolecular amount. The amount of water added in excess is not critical, however, and it is convenient to add 2–3 mol of water per mol of the polyether acetal. A water-soluble acidic substance is employed as the catalyst for the hydrolysis and dealcoholation, preferably an organic non-volatile acid such as p-toluene sulfonic acid. However, other organic acids such as acetic acid can be used, or inorganic acids such as HCl, $H_2SO_4$, $H_3PO_4$, or water-soluble acid reacting salts such as $NH_4Cl$, $ZnCl_2$, $NaHSO_4$, and the like. The amount of acid is small, amounting, for example, to 0.001 to 0.1 mol per mol of water. The temperature is advantageously maintained at from 50 to 100° C. In general, the temperature may suitably be maintained at about the boiling point of the alcohol which is eliminated, within the aforesaid range. Since this step involves formation of a poly-unsaturated aldehyde, oxygen is preferably excluded to avoid excessive loss from oxidation or polymerization of the product. Moreover, the polyolefinic aldehyde produced is protected from contact with oxygen until and during its subsequent conversion to vitamin A.

The final step of the process corresponding to Example 4 above involves reduction of the aldehyde with the aluminate of a secondary alcohol, e. g. isopropanol, 2-butanol, or 2- or 3-pentanol. Aluminum isopropylate is particularly well suited since the alcohol as well as the acetone produced therefrom are volatile and water-soluble, and can therefore be readily removed from the reaction product. Reduction of the polyolefinic aldehyde to vitamin A is carried out in alcoholic solution under anhydrous conditions, and the final product can be recovered as indicated in the example by extraction with hydrocarbon solvents.

Other variations and modifications which will be obvious to those skilled in the art can be made in the foregoing process without departing from the scope or spirit of this invention.

I claim:

1. In a process for the synthesis of vitamin A or of an intermediate therefor, the steps which comprise reacting beta-ionone with an ortho-carboxylic acid ester to form a beta-ionone ketal, condensing the resulting ketal successively with 1 molecule of a vinyl ether, 1 molecule of an isopropenyl ether and 1 molecule of a vinyl ether, to form a polyether acetal having the formula:

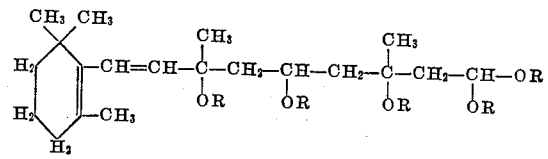

wherein the R's represent hydrocarbon groups, and simultaneously dealcoholizing and hydrolyzing said polyether acetal to form a polyolefinic aldehyde, which yields vitamin A upon reduction with an aluminum alcoholate of a secondary alcohol.

2. In a process for the synthesis of vitamin A or of an intermediate therefor, the step which consists in reacting beta-ionone with an ortho-carboxylic acid ester in the presence of an acid condensation catalyst to form a beta-ionone ketal.

3. A process as defined in claim 2, wherein the ortho-carboxylic acid ester is an ortho-formate of a lower aliphatic alcohol and the catalyst is BF₃ etherate.

4. In a process for the synthesis of vitamin A or of an intermediate therefor, the step which consists in condensing a beta-ionone ketal with a vinyl ether in the presence of an acid condensation catalyst to form an ether acetal having the formula:

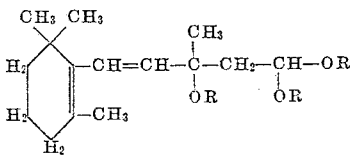

wherein the R's represent hydrocarbon radicals.

5. A process as claimed in claim 4, wherein the vinyl ether is vinyl methyl ether and the condensation is carried out in the presence of BF₃ etherate as the catalyst.

6. In a process for the synthesis of vitamin A or of an intermediate therefor, the step which consists in condensing an ether acetal having the formula:

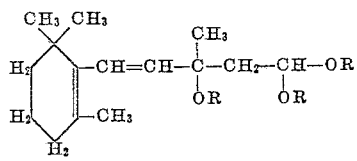

with an isopropenyl ether in the presence of an acid condensation catalyst to form a polyether acetal having the formula:

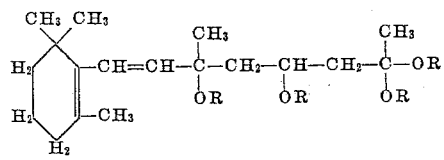

the R's representing hydrocarbon radicals in both formulas.

7. A process as defined in claim 6, wherein the isopropenyl ether is isopropenyl methyl ether and the condensation is carried out in the presence of BF₃ etherate as the catalyst.

8. In a process for the synthesis of vitamin A or of an intermediate therefor, the step which consists in condensing a polyether acetal having the formula:

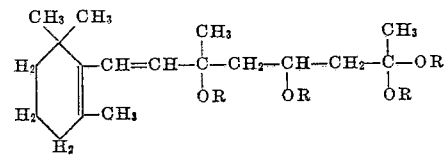

with a vinyl ether in the presence of an acid condensation catalyst to form a polyether acetal having the formula:

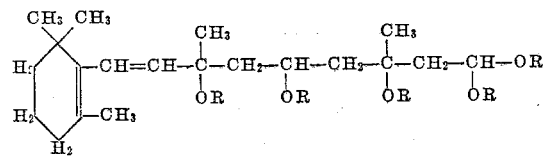

the R's representing hydrocarbon radicals in both formulas.

9. A process as defined in claim 8, wherein the vinyl ether is vinyl methyl ether, and the condensation is carried out in the presence of BF₃ etherate as the catalyst.

10. In a process for the synthesis of vitamin A or of an intermediate therefor, the step which consists in heating a polyether acetal having the formula:

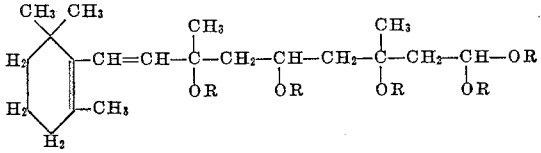

wherein the R's represent hydrocarbon radicals, with at least an equimolecular amount of water in the presence of a water-soluble acidic substance as the catalyst at a temperature of 50 to 100° C. in an inert non-oxidizing atmosphere, whereby said polyether acetal is converted to a polyolefinic aldehyde having the formula:

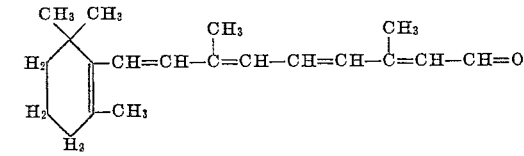

11. A process as defined in claim 10, wherein the acidic substance is para-toluene sulfonic acid and the R's represent methyl groups in the formula of the polyether acetal.

12. A compound of the general formula:

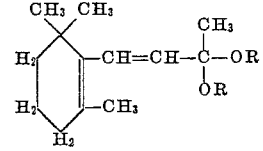

wherein R represents the hydrocarbon radical of an alcohol.

13. A compound of the general formula:

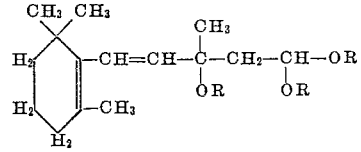

wherein R represents the hydrocarbon radical of an alcohol.

14. A compound of the general formula:

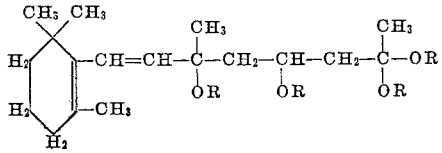

wherein R represents the hydrocarbon radical of an alcohol.

15. A compound of the general formula:

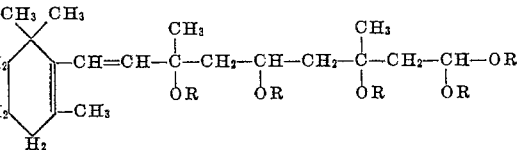

wherein R represents the hydrocarbon radical of an alcohol.

JOHN WILLIAM COPENHAVER.

No references cited.